(12) United States Patent
Gregory et al.

(10) Patent No.: US 7,644,636 B2
(45) Date of Patent: Jan. 12, 2010

(54) LOAD PIN BRAKE CELL APPARATUS

(75) Inventors: Sean D. Gregory, Columbus, OH (US); Brian D. Richards, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/016,402

(22) Filed: Jan. 18, 2008

(65) Prior Publication Data
US 2009/0183561 A1 Jul. 23, 2009

(51) Int. Cl.
*G01L 1/04* (2006.01)
(52) U.S. Cl. .................................. 73/862.621
(58) Field of Classification Search .. 73/862.61–862.69
See application file for complete search history.

(56) References Cited

U.S. PATENT DOCUMENTS

| | | | | |
|---|---|---|---|---|
| 3,857,452 A | * | 12/1974 | Hartman | 177/139 |
| 4,858,475 A | * | 8/1989 | Jacobson et al. | 73/862.631 |
| 5,309,372 A | | 5/1994 | Marui et al. | 364/491 |
| 6,309,208 B1 | * | 10/2001 | Kazmer et al. | 425/562 |
| 6,370,971 B1 | * | 4/2002 | Olson | 73/862.634 |
| 6,408,688 B2 | | 6/2002 | Foley et al. | 73/129 |
| 6,766,685 B2 | | 7/2004 | Foley et al. | 73/129 |
| 6,769,315 B2 | * | 8/2004 | Stevenson et al. | 73/862.629 |
| 6,955,098 B2 | * | 10/2005 | Schulze et al. | 73/862.625 |
| 2003/0106369 A1 | | 6/2003 | Foley et al. | 73/121 |
| 2003/0160412 A1 | | 8/2003 | Constans | 280/88 |
| 2004/0055832 A1 | | 3/2004 | Mercer | 188/2 D |
| 2006/0082090 A1 | | 4/2006 | Constans | 280/88 |

* cited by examiner

*Primary Examiner*—Max Noori
(74) *Attorney, Agent, or Firm*—Ortiz & Lopez, PLLC

(57) ABSTRACT

A load pin brake cell apparatus includes a load pin element that can be machined with a pair of external grooves in order to create independent load locations. A sleeve can be installed over the load pin element and can be welded at each edge of the grooves to relocate the pair of grooves to interior of the load pin element. The sleeve and the load pin act as one homogenous component to ensure a predictable and total transfer of stress and strain to a strain gauge located within the load pin. The ratio of a cross-sectional area between the sleeve and the load pin can be kept to a minimum in order to minimize the non-linearity due to bending stresses. The sleeve wall preferably possesses a sufficient thickness to prevent yielding at the grooves.

20 Claims, 4 Drawing Sheets

LOAD PIN BRAKE CELL APPARATUS

TECHNICAL FIELD

Embodiments are generally related to force sensing devices. Embodiments are also related to load measuring pins and components thereof.

BACKGROUND OF THE INVENTION

Load measuring pins can be utilized to measure load and force and provide overload protection. The pins can be mounted into machines in place of normal shafts and can be fitted with strain gauges, allowing them to produce a signal proportional to the measured load. Load measuring pins are typically an electronic device or transducer that can be utilized to convert a force into an electrical signal. Load measuring pins are designed for many diverse applications as direct replacements for clevis or pivot pins. Such components can be typically employed in the context of rope, chain and brake anchors, sheaves, shackles, bearing blocks, pivots and other similar devices.

Load measuring pins operate based on a shearing principle. That is, the deformation of the load-measuring pin proportional to a load can be measured through a strain gauge bridge integrated in the load pin. The load pin includes a relatively massive constraint, which functions as rigid members for directing the force to be measured to the strain gauge bridge while remaining substantially unaffected by extraneous forces. The constraints should be independent of typical extraneous forces that are not desired as measured quantities.

When force is applied to the load-measuring pin along its sensitive axis, the effect on the strain gauge bridge results in an output signal proportional to the applied force. The powering of the strain gauge bridge, as well as the amplification of its output signal voltage, can be performed either by an external amplifier or through an internal amplifier. The amplifier allows monitoring of several levels depending on the execution.

The majority of prior art load measuring pins can be designed with external grooves that can be machined into the outer circumference of the load pin. Such external grooves are required to provide separation between the loading surfaces and the constraint surfaces and to minimize bending stresses, which cause inherent non-linearity. These external grooves are susceptible to corrosion and hydrogen damage from plating operations, which are required to generate the bearing surface necessary in an aircraft breaking system. Similarly, the load pins do not provide an independently loaded constraint locations and a smooth internal bore for associating the strain gauges. These factors affect the performance of the load-measuring pin.

Based on the foregoing it is believed that a need exists for an improved load-measuring pin as disclosed in further detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved force sensing apparatus.

It is another aspect of the present invention to provide for an improved load-measuring pin for the creation of independent load locations.

It is further aspect of the present invention to provide for an improved load-measuring pin with smooth internal bore.

The aforementioned aspects and other objectives and advantages can now be achieved as described herein. A load pin brake cell apparatus includes a load pin element that can be machined with a pair of external grooves in order to create independent load locations. A sleeve can be installed over the load pin element and can be welded at each edge of the grooves in order to relocate the pair of grooves to the interior of the load pin element. The sleeve and the load pin element act as one homogenous piece and ensure predictable and total transfer of stress and strain to a strain gauge location inside the load pin. The ratio of cross sectional area between the sleeve and the load pin can be maintained at a minimum in order to minimize the non-linearity due to bending stresses. The sleeve wall can be thick enough to prevent yielding at the grooves.

The load pin element can be machined to form a smooth internal bore which includes the strain gauge location associated with one or more strain gauges that can be protected against physical damage, moisture and contaminants. The strain gauge undergoes a change in resistance proportional to deflection of the load locations and therefore proportional to the load applied to the independent load locations. A Wheatstone bridge or other resistance-measuring device can be connected to the strain gauge in order to accurately indicate the load on the load pin element. A cooperating connector can be utilized for coupling the strain gauges to electrical circuitry for indicating shear force.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
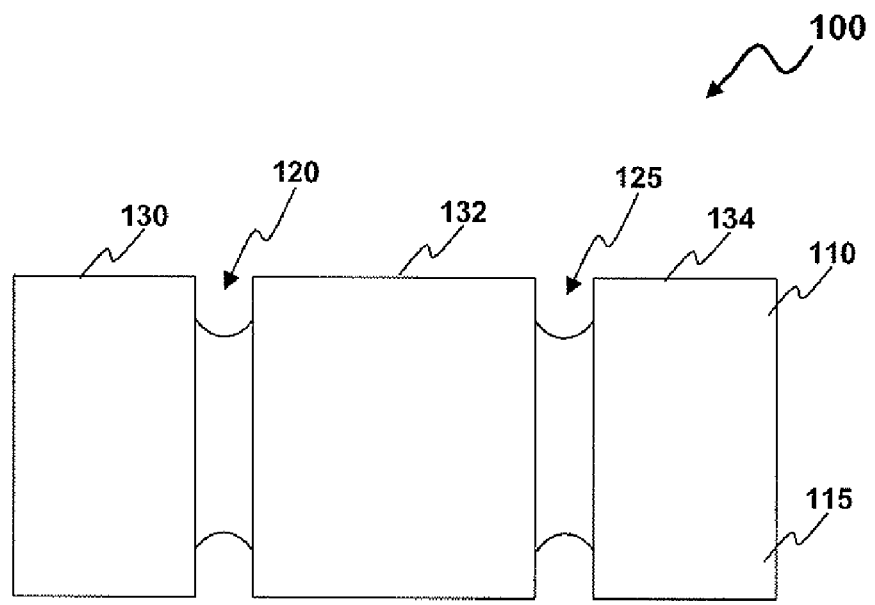
FIG. 1 illustrates a perspective view of a load pin element, which can be implemented in accordance with a preferred embodiment.

Referring to FIG. 1, a perspective view of a load pin element 100 is illustrated, which can be implemented in accordance with a preferred embodiment. The load pin element 100 depicted in FIG. 1 can be formed from an elongated section of rod selected for its mechanical properties. Preferably, the load pin element 100 is composed of steel, but can be composed of other materials, depending upon design considerations. The load pin element 100 generally possesses a cylindrical outer surface with an upper body 110 and a lower body 115. The load pin element 100 can be machined with a pair of external grooves 120 and 125 in order to create three independent load locations 130, 132 and 134. The force or load to be measured can be applied along the independent load locations 130, 132 and 134 and can be applied downwardly through load pin element 100. The pair of grooves 120 and 125 can be a round bottom groove formed in the roots of load pin element 100, such as depicted in FIG. 1.

The grooves 120 and 125 can be machined in a root of the load pin element 100 in order to minimize stress concentration at the grooves 120 and 125, which in turn reduces peak stress at the grooves 120 and 125. The locations and shapes of the grooves 120 and 125 depicted in FIG. 1 are shown for illustrative purposes only. It can be appreciated by those skilled in the art that the grooves 120 and 125 may take any shape and can be disposed in any location as may be appropriate for a particular application without departing from the spirit and scope of the disclosed embodiments.

Figure 2:
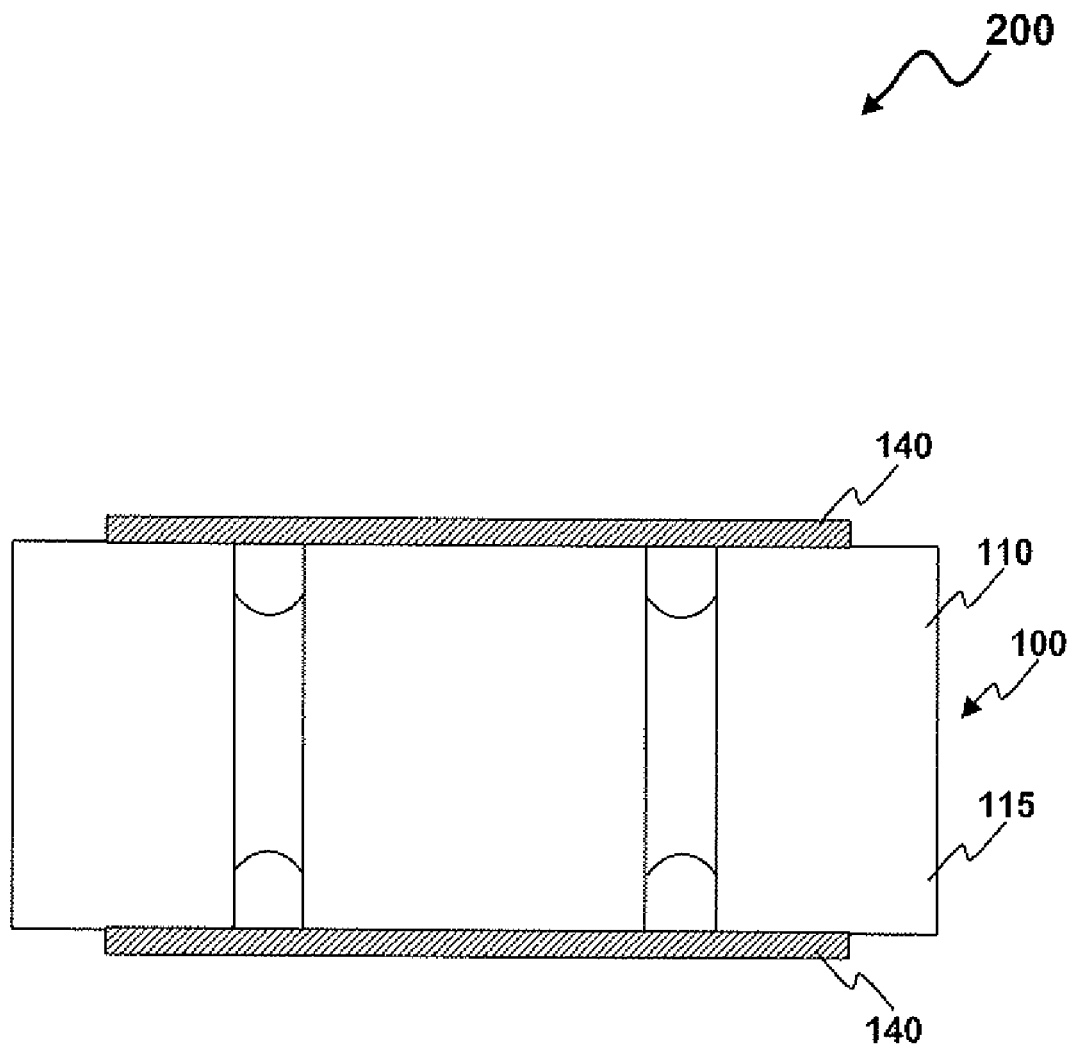
FIG. 2 illustrates a perspective view of a load pin element associated with a sleeve, which can be implemented in accordance with a preferred embodiment.

Referring to FIG. 2, a perspective view of a load pin brake cell apparatus 200 associated with a sleeve is illustrated, in accordance with a preferred embodiment. A sleeve 140 can be installed over the load pin element 100 in order to relocate the pair of grooves 120 and 125 to the interior of the load pin element 100. The sleeve 140 protects the grooves 120 and 125 from corrosion and hydrogen damage. The sleeve 140 can be welded to a required depth by, for example, electron beam welding or keyhole welding at each load locations 130, 132 and 134 in order to fix the sleeve 140 to the load pin element 100. Welding refers to a permanent connection, which is preferably formed by fusion of the materials or by the formation of an alloy at the area of the parts to be connected. The ratio of cross sectional area between the sleeve 140 and the load pin element 100 can be maintained at a minimum value in order to minimize non-linearity due to bending stresses. The sleeve 140 can be just thick enough to prevent yielding at the grooves 120 and 125.

Figure 3:
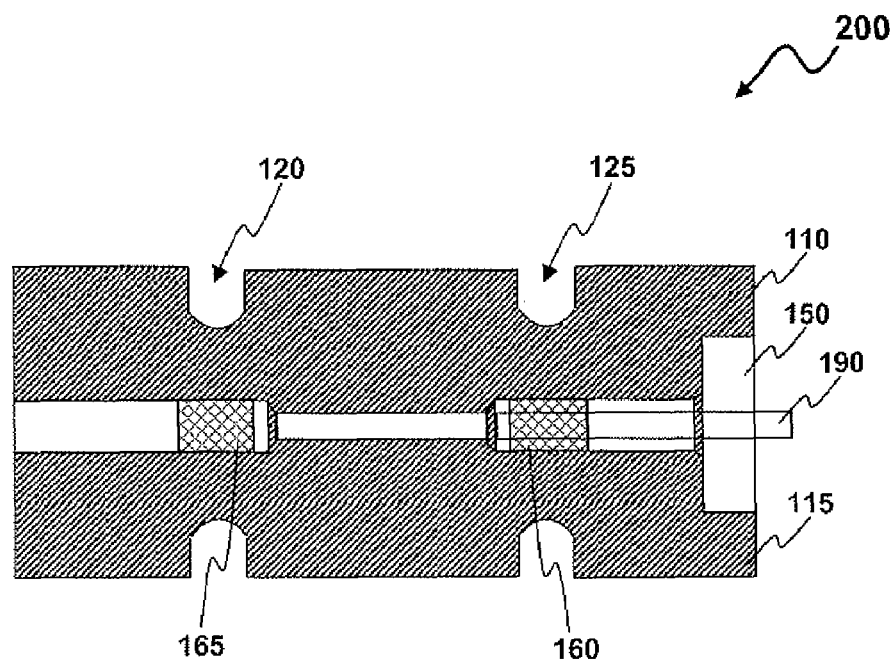
FIG. 3 illustrates a cross sectional view of the load pin brake cell apparatus, which can be implemented in accordance with a preferred embodiment.

Referring to FIG. 3, a cross sectional view of the load pin brake cell apparatus 200 is illustrated, which can be implemented in accordance with a preferred embodiment. The load pin element 100 can be machined to form a smooth central internal bore 150. The central internal bore 150 can be of rectangular cross-section. It is not, however, essential that the cross-section be rectangular. It may be of any other suitable shape or configuration. The central bore 150 can be machined adjacent to the external grooves 120 and 125. The central bore 150 can include one or more strain gauges such as gauges 160 and 165 as shown in FIG. 3 and can be mounted in a full-bridge configuration. The positioning and orientation of the strain gauges 160 and 165 can be optimized by means of a finite element method (FEM).

The central internal bore 150 includes a cooperating connector 190 which can be utilized for coupling the strain gauges 160 and 165 to electrical circuitry for indicating shear force. As the strain gauges 160 and 165 and connector 190 of the load pin element 100 is totally contained within the small central internal bore 150, the load pin brake cell apparatus 200 is inherently waterproof. The sleeve 140 and the load pin element 100 together can form a single homogeneous component in order to ensure predictable and total transfer of stress and strain to the strain gauges 160 and 165 inside the load pin apparatus 200.

The strain gauges such as gauges 160 and 165 can be symmetrically arranged about the minimum depth point at a central vertical plane of the load pin element 100. The strain gauges 160 and 165 can also be bonded to the surface of the smooth central internal bore 150 in a conventional manner, as will be understood by those skilled in the art. The curved shape of central internal bore 150 facilitates placement of the strain gauges 160 and 165 at the point of maximum stress and also provides maximum stiffness for a given level of sensitivity. A load can be applied to the independent load locations 130, 132 and 134 of the load pin element 100 which bend in an amount proportional to the load, within a limited range of loading. The bending effect on the strain gauges 160 and 165 results in an output signal proportional to the applied force. The strain gauges 160 and 165 are of the common type, which undergoes a change in resistance proportional to its elongation or compression.

A Wheatstone bridge or other accurate resistance-measuring device can be connected to the strain gauges 160 and 165 to measure the change in resistance, all in a well known manner, to measure deflection and therefore to indicate the amount of load on the load locations 130, 132 and 134. The powering of the strain gauges 160 and 165 as well as the amplification of the output signal voltage, can be performed by an amplifier (not shown). As will be understood by those skilled in the art, the placement of central internal bore 150 midway between upper body 110 and the lower body 115 results in the isolation of the central internal bore 150 from certain of the extraneous forces and moments. Other residual or extraneous forces can be cancelled out by the Wheatstone bridge arrangement of the strain gauges 160 and 165. The internal grooves 120 and 125 and the strain gauges 160 and 165 can be protected by the sleeve 140 against physical damage, moisture and contaminants.

Figure 4:
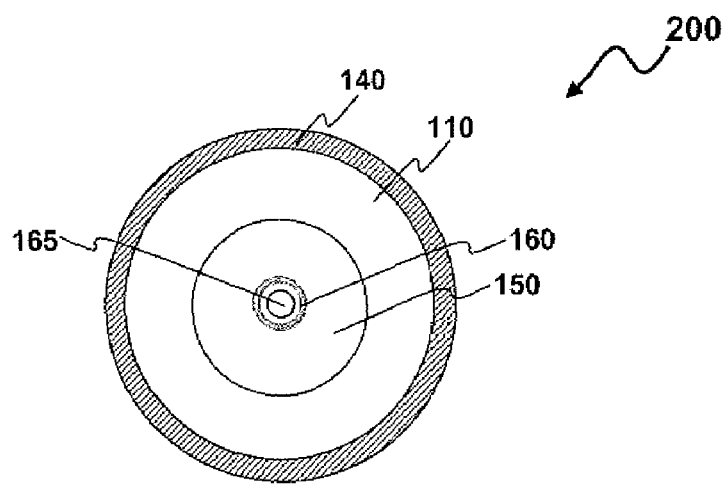
FIG. 4 illustrates a front view of the load pin brake cell apparatus, which can be implemented in accordance with a preferred embodiment.

Referring to FIG. 4, a front view of the load pin brake cell apparatus 200 is illustrated, in accordance with a preferred embodiment. The load pin brake cell apparatus 200 can be machined to achieve desired dimensions such that the non-linearity due to bending stresses can be minimized. The pair of external grooves 120 and 125 can be formed in a manner to concentrate the shear forces experienced by the load pin element 100 at predetermined internal load sensing positions where strain gauges 160 and 165 are located. The load pin brake cell apparatus 200 involves metallic members and metallic supports. However, the member may alternatively be made of partly elastic ceramic materials or plastics in accordance with a relevant application. The sleeve 140 is then preferably configured of the same or a similar material as the load pin element 100.

Figure 5:
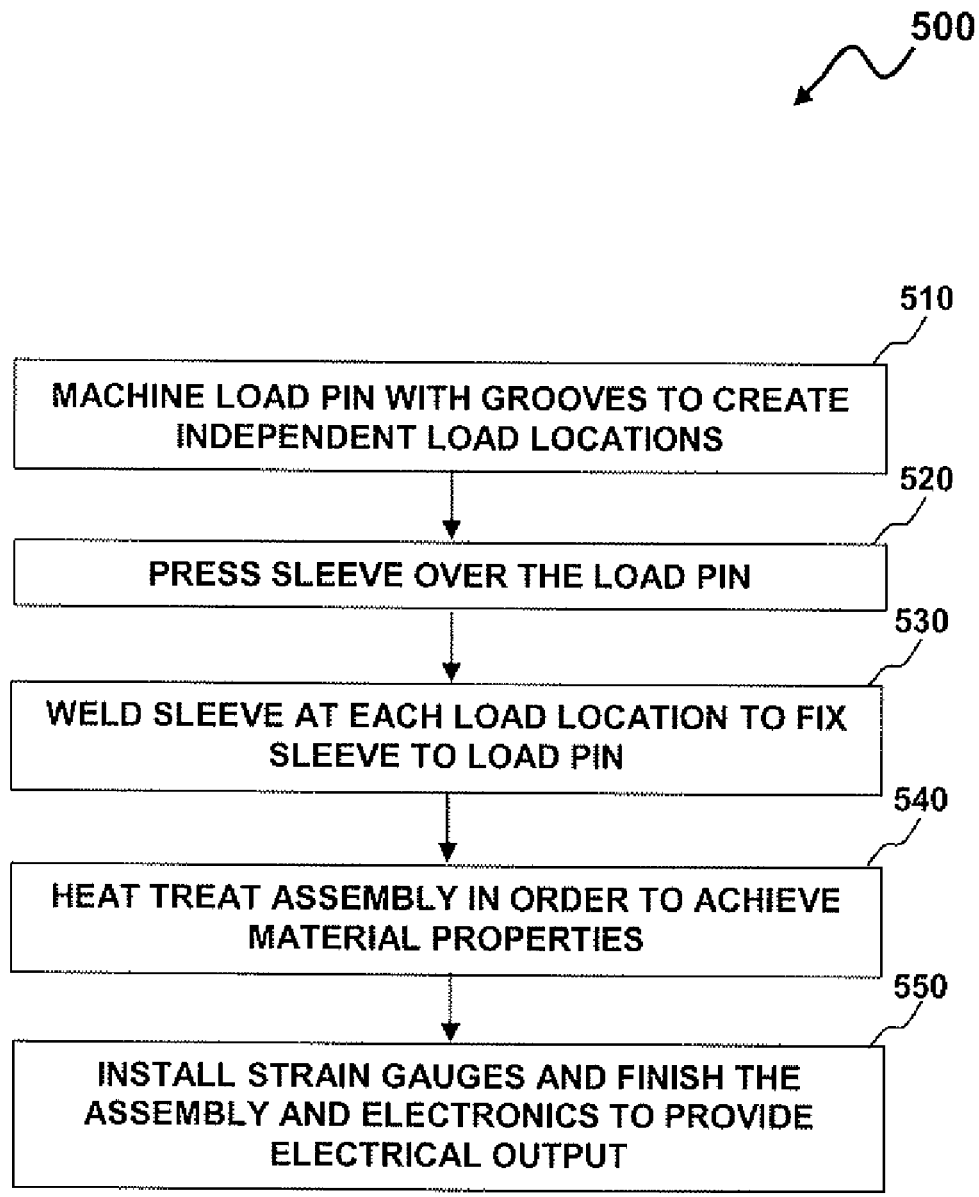
FIG. 5 illustrates a detailed flow chart of operations illustrating logical operational steps of a method for fabricating the load pin brake cell apparatus, which can be implemented in accordance with a preferred embodiment.

Referring to FIG. 5, a detailed flow chart of operations illustrating logical operational steps of a method 600 for fabricating the load pin brake cell apparatus is illustrated, in accordance with a preferred embodiment. As indicated at block 510, a load pin element 100 can be machined with a pair of grooves 120 and 125 to create three independent locations 130, 132 and 134. Next, as depicted at block 520, a sleeve 140 can be pressed over the load pin element 100. The sleeve 140 can be welded at each loading location 130, 132 and 134 in order to fix the sleeve 140 to the load pin element 100, as shown at block 530. The load pin element 100 and the sleeve 140 can be heat treated in order to achieve material properties, as described at block 540. The strain gauges 160 and 165 can be installed and the assembly and electronics can be finished in order to provide an electrical output, as depicted at block 550.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A load pin brake cell apparatus, comprising:
a load pin element having a pair of external grooves;
a plurality of independent load locations formed from said pair of external grooves wherein said pair of external groove define shear planes which are located between forces being measured by said load pin brake cell apparatus;
a sleeve associated with said load pin element and welded to said load pin element at each edge of said pair of grooves in order to relocate said pair of grooves to an interior of said load pin element; and
at least two strain gauges affixed to said load pin element through a smooth central internal bore to sense a deformation, wherein said sleeve and said load pin element form a homogeneous component in order to ensure a predictable and total transfer of stress and strain to said at least two strain gauges within said load pin element.

2. The apparatus of claim 1 further comprising:
a cooperating connector for coupling said at least two strain gauges to an electrical circuit for indicating shear force thereof.

3. The apparatus of claim 1 wherein said sleeve possesses a thickness sufficient to prevent a yielding at said pair of grooves.

4. The apparatus of claim 1 wherein said at least two strain gauges are responsive to a strain on said load pin element in accordance with a force on said plurality of independent load locations.

5. The apparatus of claim 1 wherein said pair of external grooves minimizes a non-linearity due to bending stresses by minimizing a ratio of a cross-sectional area between said sleeve and said load pin element.

6. The apparatus of claim 1 further comprising:
a cooperating connector for coupling said at least two strain gauges to an electrical circuit for indicating shear force thereof, and wherein said sleeve possesses a thickness sufficient to prevent a yielding at said pair of grooves.

7. The apparatus of claim 1 wherein:
said at least two strain gauges are responsive to a strain on said load pin element in accordance with a force on said plurality of independent load locations; and
said sleeve possesses a thickness sufficient to prevent a yielding at said pair of grooves.

8. The apparatus of claim 1 wherein:
wherein said pair of external grooves minimizes a non-linearity due to bending stresses by minimizing a ratio of a cross-sectional area between said sleeve and said load pin element; and
said sleeve possesses a thickness sufficient to prevent a yielding at said pair of grooves.

9. The apparatus of claim 1 wherein:
wherein said at least two strain gauges are responsive to a strain on said load pin element in accordance with a force on said plurality of independent load locations; and
wherein said pair of external grooves minimizes a non-linearity due to bending stresses by minimizing a ratio of a cross-sectional area between said sleeve and said load pin element.

10. The apparatus of claim 1 further comprising:
a cooperating connector for coupling said at least two strain gauges to an electrical circuit for indicating shear force thereof;
wherein said sleeve possesses a thickness sufficient to prevent a yielding at said pair of grooves;
wherein said at least two strain gauges are responsive to a strain on said load pin element in accordance with a force on said plurality of independent load locations; and
wherein said pair of external grooves minimizes a non-linearity due to bending stresses by minimizing a ratio of a cross-sectional area between said sleeve and said load pin element.

11. A force sensing method, comprising:
providing a load pin element having a pair of external grooves therein in order to form a plurality of independent load locations wherein said pair of external groove define shear planes which are located between forces being measured by said load pin brake cell apparatus;
pressing a sleeve associated with said load pin element over said load pin element, wherein said sleeve is welded to said load pin element at each edge of said pair of grooves in order to relocate said pair of grooves to an interior of said load pin element;
installing at least two strain gauges by affixing said at least two strain gauges to said load pin element through a smooth central internal bore to sense a deformation; and
coupling a cooperating connector to said strain gauges for connecting said at least two strain gauges to an electrical circuit for indicating shear force thereof, wherein said sleeve and said load pin element form a homogeneous component in order to ensure a predictable and total transfer of stress and strain to said at least two strain gauges within said load pin element allowing for the accurate measurement of force applied thereto.

12. The method of claim 11 wherein said sleeve possesses a thickness sufficient to prevent a yielding at said pair of grooves.

13. The method of claim 11 wherein said at least two strain gauges are responsive to a strain on said load pin element in accordance with a force on said plurality of independent load locations.

14. The method of claim 11 wherein said pair of external grooves minimizes a non-linearity due to bending stresses by minimizing a ratio of a cross-sectional area between said sleeve and said load pin element.

15. The method of claim 11 further comprising:
a cooperating connector for coupling said at least two strain gauges to an electrical circuit for indicating shear force thereof, and wherein said sleeve possesses a thickness sufficient to prevent a yielding at said pair of grooves.

16. The method of claim 11 wherein:
said at least two strain gauges are responsive to a strain on said load pin element in accordance with a force on said plurality of independent load locations; and
said sleeve possesses a thickness sufficient to prevent a yielding at said pair of grooves.

17. The method of claim 11 wherein:
wherein said pair of external grooves minimizes a non-linearity due to bending stresses by minimizing a ratio of a cross-sectional area between said sleeve and said load pin element; and said sleeve possesses a thickness sufficient to prevent a yielding at said pair of grooves.

18. The method of claim 11 wherein:

wherein said at least two strain gauges are responsive to a strain on said load pin element in accordance with a force on said plurality of independent load locations; and wherein said pair of external grooves minimizes a non-linearity due to bending stresses by minimizing a ratio of a cross-sectional area between said sleeve and said load pin element.

19. The method of claim 11 further comprising:

a cooperating connector for coupling said at least two strain gauges to an electrical circuit for indicating shear force thereof;

wherein said sleeve possesses a thickness sufficient to prevent a yielding at said pair of grooves;

wherein said at least two strain gauges are responsive to a strain on said load pin element in accordance with a force on said plurality of independent load locations; and wherein said pair of external grooves minimizes a non-linearity due to bending stresses by minimizing a ratio of a cross-sectional area between said sleeve and said load pin element.

20. A load pin brake cell apparatus, comprising:

a load pin element having a pair of external grooves therein in order to form a plurality of independent load locations wherein said pair of external groove define shear planes which are located between forces being measured by said load pin brake cell apparatus;

a sleeve associated with said load pin element, wherein said sleeve is welded to said load pin element at each edge of said pair of grooves in order to relocate said pair of grooves to an interior of said load pin element; and at least two strain gauges affixed to said load pin element through a smooth central internal bore to sense a deformation; and a cooperating connector for coupling said at least two strain gauges to an electrical circuit for indicating shear force thereof, wherein said sleeve and said load pin element form a homogeneous component in order to ensure a predictable and total transfer of stress and strain to said at least two strain gauges within said load pin element, wherein said at least two strain gauges are responsive to a strain on said load pin element in accordance with a force on said plurality of independent load locations and wherein said pair of external grooves minimizes a non-linearity due to bending stresses by minimizing a ratio of a cross-sectional area between said sleeve and said load pin element.

* * * * *